United States Patent [19]

Godwin

[11] Patent Number: 4,949,906
[45] Date of Patent: Aug. 21, 1990

[54] CONVERTIBLE DISPENSING SYSTEM

[76] Inventor: Oliver Godwin, U.S. Road 41-27; P.O. Box 1136, High Springs, Fla. 42643

[21] Appl. No.: 327,294

[22] Filed: Mar. 22, 1989

[51] Int. Cl.$^5$ ............................................. A01C 23/00
[52] U.S. Cl. .................................... 239/663; 239/172; 239/143; 239/379; 239/683
[58] Field of Search ............... 239/663, 662, 683, 289, 239/379, 336, 172, 143; 241/101 D, 101 E

[56] References Cited

U.S. PATENT DOCUMENTS

| | | | |
|---|---|---|---|
| 3,767,126 | 10/1973 | van der Lely | 239/683 X |
| 4,185,782 | 1/1980 | Bebros | 239/663 |
| 4,408,220 | 10/1983 | Anderson et al. | 239/683 X |
| 4,793,325 | 1/1989 | Bloch | 239/289 X |

FOREIGN PATENT DOCUMENTS 1145549  3/1963  Fed. Rep. of Germany .

Primary Examiner—Andres Kashnikow
Assistant Examiner—Kevin P. Weldon
Attorney, Agent, or Firm—Dressler, Goldsmith, Shore, Sutker & Milnamow, Ltd.

[57] ABSTRACT

The present invention contemplates a convertible dispensing system for selectively dispensing liquids and particulate solids. The dispensing system includes a tank structure, with selectable particulate solids dispenser and a liquid dispenser, both positioned generally at the lower extent of the tank structure. A converting arrangement is provided for selectively bypassing one of the dispensers while maintaining the other dispenser in communication with the materials chamber defined by the tank structure.

9 Claims, 3 Drawing Sheets

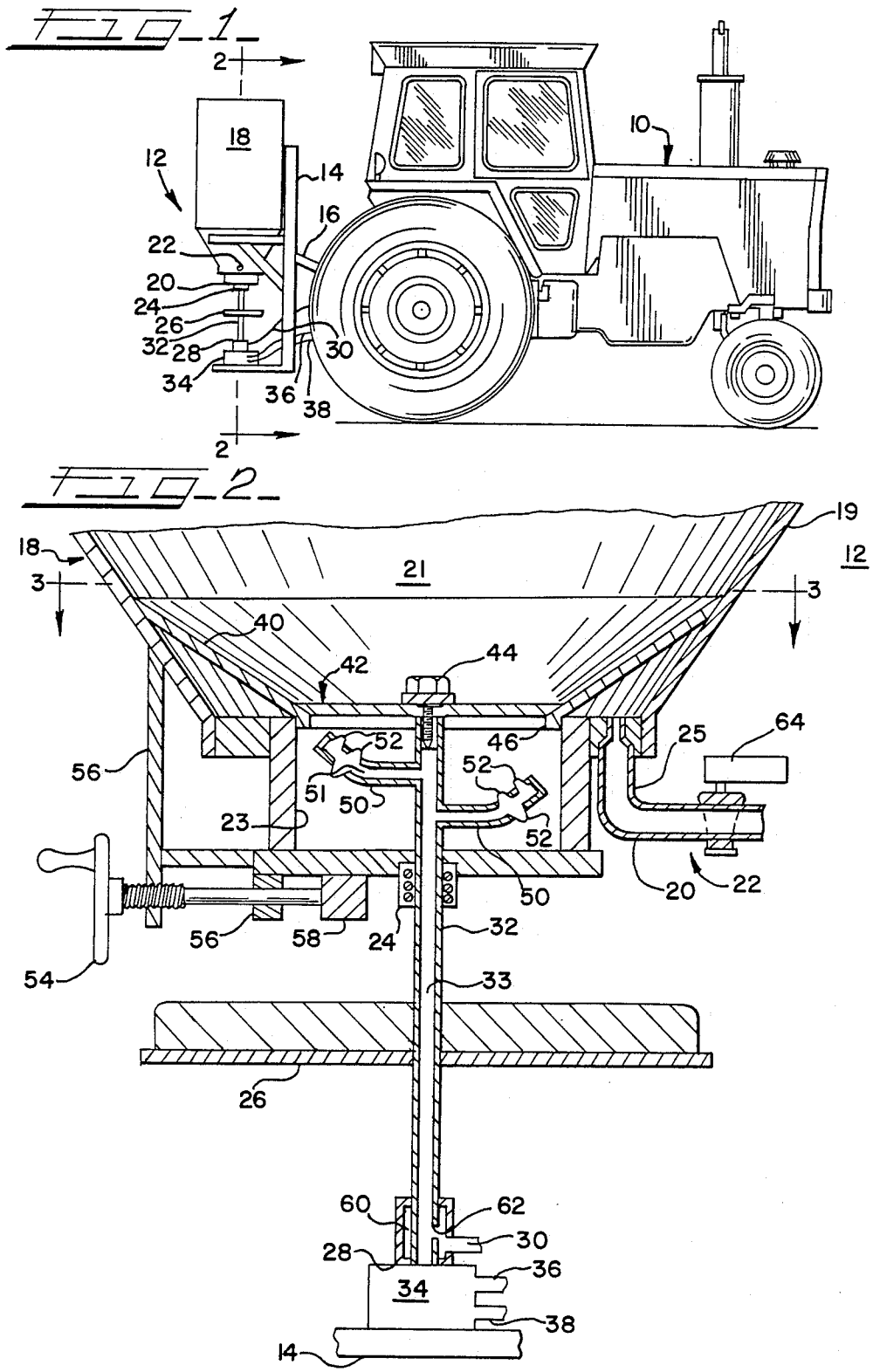

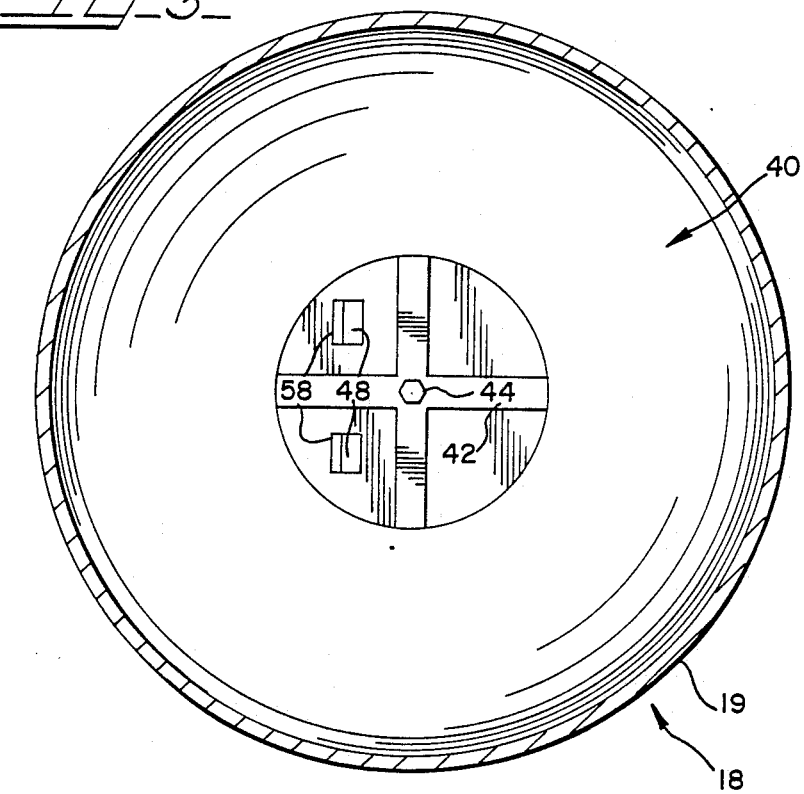
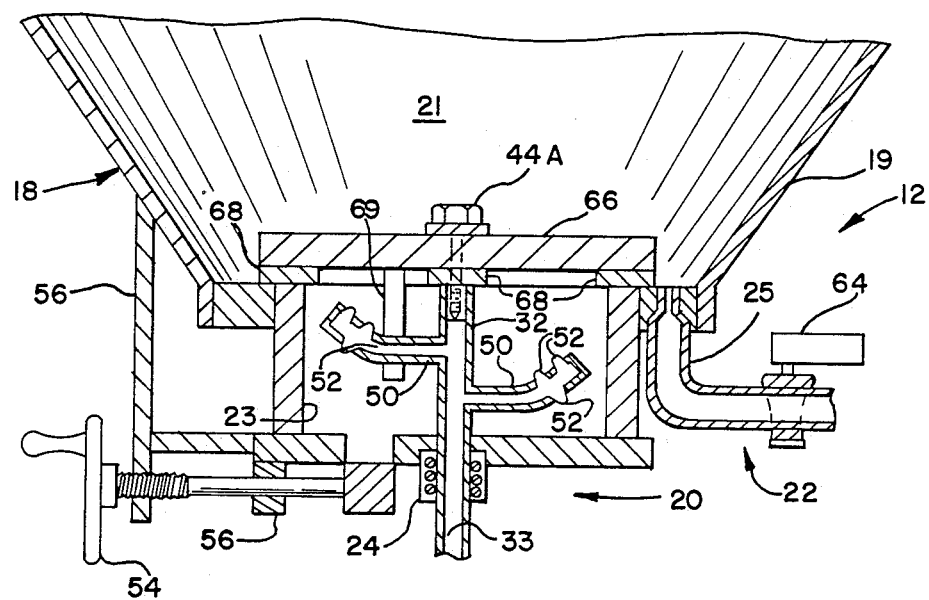

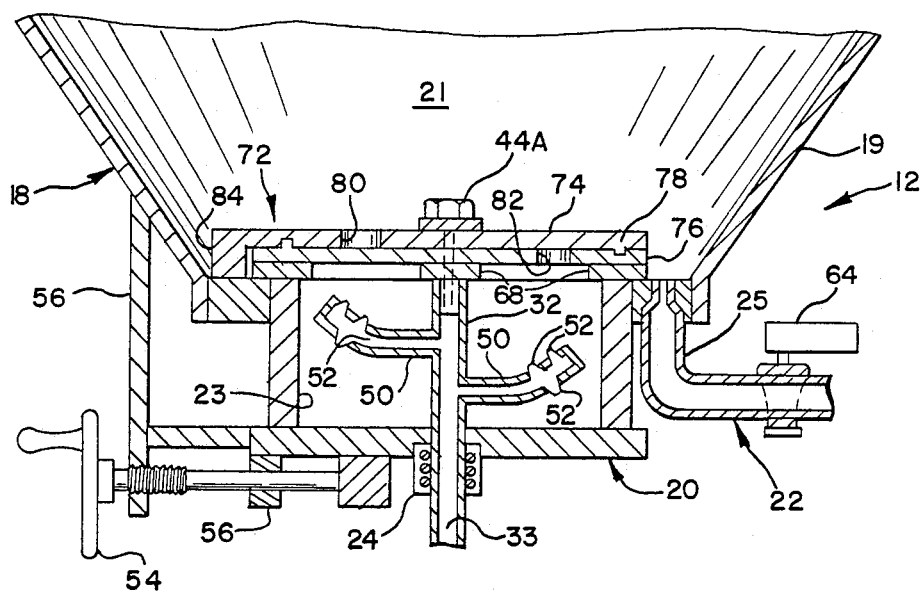

CONVERTIBLE DISPENSING SYSTEM

TECHNICAL FIELD

This invention relates generally to mobile, power-driven dispensing devices, and more particularly to a convertible dispensing system suitable for selectively dispensing dry and liquid materials. The present dispensing system includes a first dispensing means and a second dispensing means both positioned generally at the lower extent of an associated tank structure, and an arrangement for selectively, and interchangeably, by-passing one or the other of the dispensing means while maintaining a selected dispensing means in communication with the interior of the tank structure.

BACKGROUND OF THE INVENTION

Many devices are known for dispensing material. Typically, these devices include a tank, or hopper, for holding the material to be dispensed, and a dispensing mechanism for controlling the rate of dispensing. Such dispensing devices can be mounted on or drawn behind an associated vehicle. One such device is disclosed in U.S. Pat. No. 3,964,681 to Herd.

The typical device is adapted to dispense only one type of material, be it solid or liquid in nature, and has only one dispensing means. Thus, such a device cannot easily be converted to dispense a material different than the type it was designed for. As a result, when a device for dispensing particulate solids is attached or mounted to a vehicle and it is desired to dispense a liquid material, the entire particulate dispensing device must be removed and replaced with the liquid dispensing device. Such replacement is time consuming, with the lack of versatility of typical devices resulting in the need for two complete dispensing devices if different types of material are to be handled.

SUMMARY OF THE INVENTION

The present invention contemplates a convertible dispensing system that can be utilized for selectively dispensing solid and liquid materials from a tank structure. The dispensing system includes, in addition to the tank structure, a first dispensing means and a second dispensing means positioned generally at the lower extent of the tank structure. A converting means is also provided that can be a selector for isolating one of the first and second dispensing means while maintaining the other dispensing means in communication with an interior materials chamber of the tank structure.

The first dispensing means is adapted to dispense, by gravity, particulate solids from within the tank structure and preferably comprises an adjustable gate means for controlling flow of the particulate solids. In the illustrated embodiments, the first dispensing means includes agitation means to inhibit bridging of the particulate solid, and a rotatably driven broadcast means positioned beneath the gate means to distribute particulate solids flowing through the gate means that impinge upon the broadcast means.

The second dispensing means is adapted to dispense, by gravity, a liquid material from within the tank structure and includes a valve means for controlling flow of the liquid material from within the tank structure through a liquid discharge conduit.

In one configuration, the converting means includes a removable, hollow collar-like ring that is positionable in the tank structure for cooperating with the sidewalls of the tank structure to guide the particulate solids to the first, solid dispensing means, by-passing the second liquid dispensing means. The collar-like ring can be easily removed, and interchanged with a sealing means for sealing and by-passing the first particulate dispensing means and for guiding liquid material to the second dispensing means.

Thus, the tank structure can be interchangeably utilized to dispense particulate solids when the collar-like ring is positioned therein, and to dispense liquid material when the sealing means is positioned therein. This enables the one tank structure to dispense substantially different materials through the two different dispensing means to more efficiently use the tank structure.

The present invention thus eliminates the need to replace the entire dispensing device when materials of different phases are dispensed, as required when conventional devices are utilized. This can desirably result in savings of time due to faster change-overs, and greatly reduces expenses because only one system is needed whereas before two devices were needed.

The present dispensing system is suitable for interchangeably dispensing various materials that are solid or liquid in nature. Illustrative particulate solids include, sand, salt, seed, gravel, fertilizer in solid form, chemicals, and like flowable solids. Illustrative liquid materials include water, aqueous herbicide or pesticide solutions, fertilizer in liquid form, and like liquids that are flowable under the usual dispensing conditions.

Numerous other advantages and features of the present invention will become readily apparent from the following detailed description of the preferred embodiments, the drawings and the appended claims.

BRIEF DESCRIPTION OF THE DRAWINGS

FIG. 1 is a side elevational view of a convertible dispensing system of the present invention mounted on a tractor;

FIG. 2 is a fragmentary, sectional view, taken on plane 2—2 of FIG. 1, of the convertible dispensing system of the present invention configured for dispensing particulate solids;

FIG. 3 is a top elevational, partial sectional view, taken on plane 3—3 of FIG. 2;

FIG. 4 is a fragmentary, sectional view of the convertible dispensing system of the present invention configured for dispensing a liquid material; and FIG. 5 is a fragmentary, sectional view of an alternative embodiment of the convertible dispensing system of the present invention configured for dispensing a liquid material.

DETAILED DESCRIPTION OF PREFERRED EMBODIMENTS

Although this invention is susceptible to embodiment in many different forms, there are shown in the drawings and will be described in detail, presently preferred embodiments of the invention. It should be understood, however, that the present disclosure is to be considered as an exemplification of the principles of this invention and is not intended to limit the invention to the embodiment illustrated.

In accordance with the present invention, a convertible dispensing system 12 is shown in FIG. 1 mounted on a tractor 10. As will be appreciated, the dispensing system 12 can be mounted to other conventional vehicles, such as trucks, and can be otherwise suitably attached to a vehicle, such as by mounting the system on a wheeled frame so that it can be drawn behind a tractor or the like.

A hitch 16 connects a dispensing system support frame 14 to the tractor 10. The dispensing system 12 includes a tank structure 18. Notably, positioned generally at the lower extent of the tank structure 18 are a first, solids dispensing means 20 and a second, liquid dispensing means 22.

The first dispensing means 20 is adapted to dispense, by gravity, particulate solids from within the tank structure 18, which structure can have a round or square configuration, as desired. In contrast, the second dispensing means 22 is adapted to dispense, by gravity, a liquid material from within the tank structure 18. Also, the second dispensing means can be a drain in applications where the liquid contents of tank structure 18 is distributed by a spray device having a feed conduit positioned submerged in the contained liquid.

As will be further described, the first dispensing means 20 can include a rotatably driven broadcasting device for distributing particulate material, and an agitator mechanism to promote solid phase material flow. To this end, a rotatable shaft 32 extends vertically through a seal bearing 24, and has mounted thereon a rotatably driven broadcaster means 26. An air chamber housing 28, having the shaft 32 rotatably extending therethrough, is supplied with air by an air feed line 30 from an associated air source that is not shown. A lower end of the shaft 32 is connected to, and driven by, a hydraulic motor 34 supplied with pressurized hydraulic fluid from feed line 36, with return fluid flow via return line 38.

A configuration of the present invention for dispensing particulate solids from a material chamber 21 defined by tank structure 18 is illustrated in FIGS. 2 and 3. The converting means is positioned within material chamber 21 and selectively by-passes the second, liquid dispensing means 22. The converting means preferably comprises a removable, generally frusto-conical hollow collar-like ring 40. This collar-like ring 40 cooperates with downwardly, inwardly tapering sidewalls 19 of the tank structure 18 to funnel the particulate solids to the first dispensing means 20, by-passing the second dispensing means 22. The collar-like ring 40 is removably secured to the shaft 32 by a securing means 44 extending through collar cross members 42 as also shown in FIG. 3, with the securing means 44 preferably configured to permit the shaft 32 to rotate relative to the collar-like ring 40. The collar-like ring 40 can also include a collar-like ring aligning means 46, illustrated as a lip-like flange, to align the collar-like ring 40 within the tank structure 18 and the first dispensing means 20.

The first, solids dispensing means 20 preferably includes an adjustable gate means 58 for controlling the flow of the particulate solids from within the tank structure 18. Control of the movement of the gate means 58, and thereby control of the size of a pair of dispensing openings 48 (FIG. 3), is by a gate control means 54 which is mounted to the tank structure 18 and the first dispensing means 20 by a suitable support means 56. In FIG. 3, the gate means 58 is adjusted partially to the left.

As noted the first dispensing means 20 includes the rotatably driven broadcast means 26, which is positioned beneath the gate means 58. Particulate solids flowing through the gate means 58 impinge upon the broadcast means 26 and are distributed thereby by the action of centrifugal force as the broadcast means 26 is driven by hydraulic motor 34.

The first dispensing means 20 can include an agitation means for stirring the particulate solids during dispensing to reduce bridging, i.e., clumping, of the particulate solids. This enhances smooth flow of the particulate solids from the first dispensing means 20. The agitation means can be located within an agitation chamber 23 of the first dispensing means 20, with the agitation chamber 23 being juxtaposed with the lower extent of tank structure 18. The agitation means can be provided in the form of rotatably driven agitation fingers 50 mounted on the shaft 32 to provide mechanical agitation of the particulate material.

To further enhance agitation, the agitation fingers 50 can each be configured to define at least one air passage 51 for effecting aeration or fluidizatin of the particulate solids. Optional additional air nozzles 52 can be utilized to control the spray pattern of the air from air passage 51. Each air passage 51 is in fluid communication with an internal conduit 33 defined by the hollow shaft 32. Thus, each air passage 51 is in fluid communication with an air chamber 60 in the air chamber housing 28, and in turn is in communication with the air feed line 30 and the associated air source via air inlet 62 (not shown).

Alternative configurations of the agitation means, not shown, can include a shaft having at least one agitation finger and situated in the agitation chamber at an acute angle to the direction of travel of the particulate solids dispensed from the first dispensing means or a movable agitation finger extending through, or from, a wall of the agitation chamber into the agitation chamber. Also, fixed air outlets that discharge within the agitation chamber to aerate, and thereby agitate, the particulate solids can be utilized.

A further alternative configuration of the first dispensing means, not shown, can include broadcast means and agitation means mounted on separate shafts. Either or both of these shafts can be operably associated with a power take-off (not shown). The power take-off derives its power from the vehicle to which the dispensing system is mounted, e.g., from the wheels of the vehicle. Preferably, the power take-off can control the speed of rotation of these shafts.

The broadcast means, alternatively, can be rotatably mounted on a platform or arm under the gate means.

For operation of the invention as shown in FIGS. 2 and 3 to dispense solids, the tank structure 18 is emptied of any liquid present and the collar-like ring 40 is secured therein. The particulate solids are then introduced into the tank structure 18. The collar-like ring 40 cooperates with the sidewalls 19 to define a duct or a chute that guides the particulate solids to the first dispensing means 20. The hydraulic motor 34 is pressurized with hydraulic fluid from feed line 36 to rotate the shaft 32. Rotation of the shaft causes rotation of both the agitation fingers 50 and broadcast means 26. As the agitation fingers 50 rotate within the agitation chamber 23 of the first dispensing means 20, they inhibit bridging of the particulate solids. To further agitate and inhibit bridging, and thereby enhance flow of the particulate solids, aeration of the particulate solids is accomplished by air injected into the agitation chamber 23 through the air passageways 51 and the air nozzles 52. Particulate solids dispensed by gravity through the dispensing openings 48 contact the rotating broadcaster means 26 which scatters the particulate solids over a relatively wide area.

FIG. 4 is an illustration in section of a configuration of the present convertible dispensing system 12 for dispensing a liquid material. The converting means further includes a sealing plate 66 which replaces collar-like ring 40 of FIGS. 2 and 3, i.e., the sealing plate 66 is used in lieu of the collar-like ring 40. The sealing plate 66 seals the first dispensing means 20 which is by-passed in this mode of operation. The sidewalls 19 of tank structure 18 and the sealing plate 66 direct the liquid material to the second dispensing means 22 which includes a liquid discharge conduit 25 in communication with material chamber 21. A selectively operable valve means 64 controls flow of the liquid material from within the tank structure 18 and through the discharge conduit 25.

Securing means 44A removably attaches sealing plate 66 to the shaft 32. Optional seals 68 further ensure that the liquid material does not enter the first dispensing means 20. A stop lug 69 can be provided in depending relation from sealing plate 66 so as to engage one of agitation fingers 50 and thereby prevent rotation of the shaft 32.

In operation, the sealing plate 66 is secured in the tank structure 18. The liquid material is then introduced into the tank structure 18 and is guided by the sealing plate 66 and the sidewalls 19 to the second dispensing means 22. The valve means 64 can be partially or completely opened to obtain flow of the liquid material from within the tank structure 18.

FIG. 5 is an illustration in section of an alternative configuration of the present convertible dispensing system 12 for dispensing a liquid material. The selector for isolating one of the dispensing means in this configuration is a plate assembly 72 that includes a top plate 74 and a bottom plate 76. Plates 74 and 76 are rotatably positionable relative to one another. Usually top plate 74 is rotatable, and bottom plate 76 is mounted in a fixed position above agitation chamber 23. Preferably, movements of the plates relative to one another during dispensing is prevented as by engaged tang and recess 78.

The top plate 74 and the bottom plate 82 define top opening 80 and bottom opening 82, respectively. When the openings are not aligned, i.e., are not in registry with each other, as shown in FIG. 5, the first dispensing means 20 is not in communication with the materials chamber 21. However, the second dispensing means 22 is in communication with the materials chamber 21. Thus, a liquid can be dispensed from materials chamber 21.

Conversion of the dispensing system 12 to dispense particulate solids is accomplished by removing liquid material from the tank 18 if any is present. The securing means 44A is then removed. One of the plates 74 and 76 is then rotated relative to the other to align the openings 80 and 82 in registry with each other, and to thereby place the first dispensing means 20 in communication with the materials chamber 21. This configuration is not illustrated.

Rotation of the plates further results in isolating the second dispensing means 22 from the materials chamber 21. Isolation, and thus sealing, of the second dispensing means 22, can be accomplished as by a finger 84 extending from the top plate 74.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. A convertible dispensing system for selectively dispensing solid and liquid phase materials, comprising:
   a tank structure including downwardly extending sidewalls and defining a single materials chamber;
   first dispensing means positioned generally at the lower extent of said tank structure, said first dispensing means being adapted to dispense, by gravity, particulate solids from within said tank structure, said first dispensing means comprising adjustable gate means for controlling flow of said particulate solids from within said tank structure through a first opening;
   second dispensing means positioned generally at the lower extent of said tank structure, said second dispensing means being adapted to dispense, by gravity, a liquid material from within said tank structure, said second dispensing means comprising valve means for controlling flow of said liquid material from within said tank structure through a second opening discrete from said first opening; and,
   means for selectively converting said system for dispersing materials of different phase, said converting means being positioned within the materials chamber and configured for selectively by-passing one of said first and said second dispensing means, while maintaining the other of said dispensing means in communication with the materials chamber of said tank structure, including means for by-passing said flow controlling valve means while said adjustable gate means is maintained in communication with said single materials chamber of said tank structure, and means for by-passing said adjustable gate means while maintaining said flow controlling valve means in communication with said single materials chamber.

2. The convertible dispersing system in accordance with claim 1, wherein said first dispensing means comprises agitator means for stirring said particulate solids during dispersing thereof.

3. The convertible dispensing system in accordance with claim 2, wherein said agitating means comprises at least one rotatably driven agitation finger.

4. The convertible dispensing system in accordance with claim 3, wherein said agitation finger defines at least one internal air passage for effecting aeration agitation of said first, particulate solid.

5. The convertible dispensing system in accordance with claim 4, wherein said agitation means further comprises a rotatably driven shaft on which said agitation finger is mounted, said shaft defining an internal conduit in fluid communication with the internal air passage of said agitation finger.

6. The convertible dispensing system in accordance with claim 1 wherein said selector means comprises a plate assembly having two plates at least one of which is rotatable relative to the other, each plate defining an opening therein, wherein alignment of said openings in registry with each other places said materials chamber in communication with said solids dispensing means while isolating said liquid dispensing means from said materials chamber and disposition of said openings out of registry with each other isolates said solids dispensing means from said materials chambers and places said liquid dispensing means in communication with said materials chamber.

7. The convertible dispensing system in accordance with claim 1, wherein said converting means comprises a removable, hollow collar-like ring positionable in said tank structure and cooperating with the sidewalls of said tank structure to guide said particulate solids to said first dispensing means while by-passing said second dispensing means, said converting means further including a removable sealing plate means positionable in said tank structure in lieu of said collar-like ring for sealing and by-passing said first dispensing means while directing liquid material to said second dispensing means.

8. A convertible dispensing system for selectively dispensing different materials, comprising:
 a tank structure including downwardly extending sidewalls and defining a single materials chamber;
 solids dispensing means positioned generally at the lower extent of said tank structure, said solids dispensing means being adapted to dispense, by gravity, particulate solids from within said tank structure and comprising an adjustable gate means for controlling flow of said particulate solids from within said tank structure through a first opening;
 said solid dispensing means further comprising agitator means for stirring said particulate solids during dispensing thereof, and rotatably drive broadcast means positioned beneath said gate means so that particulate solids flowing through said gate means impinge upon said broadcast means and is distributed thereby;
 liquid dispensing means positioned generally at the lower extent of said tank structure, said liquid dispensing means being adapted to dispense, by gravity, a liquid material from within said tank structure and comprising a liquid discharge conduit communicating with said materials chamber and defining a second opening discrete from said first opening and a valve means in said conduit for controlling flow of said liquid material through said conduit from within said tank structure; and,
 selector means for isolating one of said dispensing means from the single materials chamber of said tank structure while maintaining the other of said dispensing means in communication therewith.

9. The convertible dispensing system in accordance with claim 8, wherein said selector means comprises a removable, hollow collar-like ring positionable in said tank structure and cooperating with the sidewalls of said tank structure to funnel said particulate solids to said solids dispensing means, by-passing said liquid dispensing means, said selector means further comprising a removable sealing means positionable in said tank structure to direct said liquid material to said liquid dispenser means, by-passing said solids dispensing means.

* * * * *